(12) United States Patent
Datar et al.

(10) Patent No.: US 6,625,740 B1
(45) Date of Patent: Sep. 23, 2003

(54) DYNAMICALLY ACTIVATING AND DEACTIVATING SELECTED CIRCUIT BLOCKS OF A DATA PROCESSING INTEGRATED CIRCUIT DURING EXECUTION OF INSTRUCTIONS ACCORDING TO POWER CODE BITS APPENDED TO SELECTED INSTRUCTIONS

(75) Inventors: Rajendra Datar, Sahakarnagar (IN); Sachin Ghanekar, Aundh (IN); Ravindra Gogte, Aundh (IN); Sebastian Gracias, Aundh (IN)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 09/482,822

(22) Filed: Jan. 13, 2000

(51) Int. Cl.$^7$ ................................................. G06F 1/32
(52) U.S. Cl. ..................... 713/324; 713/300; 713/320; 713/322
(58) Field of Search ................................. 713/320, 322, 713/324; 712/214, 216, 300

(56) References Cited

U.S. PATENT DOCUMENTS

| | | | | |
|---|---|---|---|---|
| 5,420,808 A | * | 5/1995 | Alexander et al. | 713/321 |
| 5,825,674 A | * | 10/1998 | Jackson | 713/300 |
| 5,828,895 A | * | 10/1998 | Chan et al. | 712/23 |
| 6,219,796 B1 | * | 4/2001 | Bartley | 713/320 |
| 6,307,281 B1 | * | 10/2001 | Houston | 307/31 |
| 6,345,362 B1 | * | 2/2002 | Bertin et al. | 713/321 |
| 6,477,654 B1 | * | 11/2002 | Dean et al. | 713/300 |

* cited by examiner

*Primary Examiner*—Thomas Lee
*Assistant Examiner*—Paul Yanchus, III
(74) *Attorney, Agent, or Firm*—James J. Murphy, Esq.; Winstead Sechrest & Minick

(57) ABSTRACT

An integrated circuit 300 included a plurality of circuit blocks 202–206 for selectively performing data processing operations in response to a set of instructions. Circuitry 301 dynamically activates and deactivates selected ones of circuit blocks 202–206 during the execution of the set of instructions.

15 Claims, 4 Drawing Sheets

DYNAMICALLY ACTIVATING AND DEACTIVATING SELECTED CIRCUIT BLOCKS OF A DATA PROCESSING INTEGRATED CIRCUIT DURING EXECUTION OF INSTRUCTIONS ACCORDING TO POWER CODE BITS APPENDED TO SELECTED INSTRUCTIONS

BACKGROUND OF THE INVENTION

1. Field of the Invention

The present invention relates in general to circuits and methods for saving power on an integrated circuit and in particular to systems using the same.

2. Description of the Related Art

As new semiconductor fabrication techniques are developed, the number of gates which can be fabricated on a single integrated circuit chip continues to grow. As a result, more complex circuits which once required two or more chips to implement can now be provided as a single device. Present techniques allow for the fabrication of up to approximately fifty million gates per chip. By the year 2010, it has been estimated that the number of gates that can be fabricated on a single chip will approach one trillion or more.

Besides increased gate density, the maximum integrated circuit clock speeds also continue to increase with newer design and fabrication methods. Current integrated circuits operate in response to clock frequencies in the hundreds of megahertz. Within the next ten years however, clock frequencies of a gigahertz or more are expected to be common.

Higher gate densities and clock frequencies will allow the development of Systems-On-A-Chip (SoCs) in which processing circuitry, memory and input/output devices are all be fabricated together on a chip and distributed in a single package. For example, a microprocessor or microcontroller may be fabricated together with on-chip memory for storing the operating system and/or the basic input/output system (BIOS). The applications for SoCs are numerous, including portable personal computers, mobile personal communicators, and similar compact systems.

Increased gate densities and clock frequencies are not without drawbacks. Among other things, high-speed, high-density devices consume substantially more power. As a natural consequence, there can also be a substantial increase in heat dissipation. Thus, while high performance devices, like SoCs, are ideal for portable computers and telecommunications systems from the compactness point of view, the power consumption and heat dissipation problems must be carefully considered. This is especially true when addressing battery life and system packaging factors.

SUMMARY OF THE INVENTION

According to the principles of the present invention, an integrated circuit is disclosed which includes a plurality of circuit blocks for selectively performing data processing operations in response to a set of instructions. The integrated circuit further includes circuitry for dynamically powering "up" and "down" selected ones of circuit blocks during the execution of the set of instructions.

Circuitry systems and methods embodying the principles of the present invention provide substantial advantages over the prior art. Among other things, power consumption and heat dissipation can be more precisely controlled and optimized since individual circuit blocks can be activated and deactivated. Moreover, since power control can be done in firmware and/or software, maximum flexibility is achieved. In other words, the user can customize the operation of the chip as required for a given application.

BRIEF DESCRIPTION OF THE DRAWINGS

For a more complete understanding of the present invention, and the advantages thereof, reference is now made to the following descriptions taken in conjunction with the accompanying drawing, in which.

DESCRIPTION OF THE PREFERRED EMBODIMENTS

The principles of the present invention and their advantages are best understood by referring to the illustrated embodiment depicted in FIGS. 1–4 of the drawings, in which like numbers designate like parts.

Figure 1:
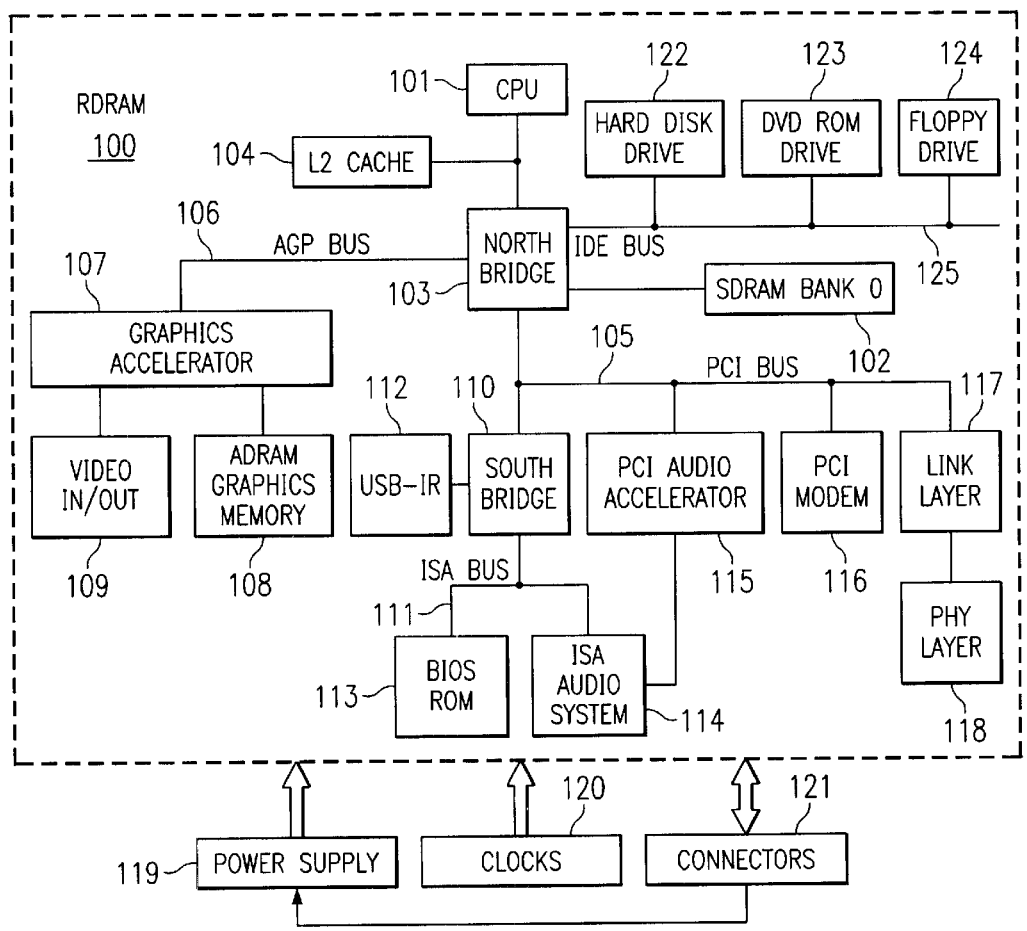
FIG. 1 is a diagram of an exemplary computer system embodying the teachings of the present invention.

FIG. 1 is a diagram of an exemplary computer system 100 embodying the teachings of the present invention. System 100 advantageously integrates the functionality of a general purpose microprocessor based computer system with the high quality audio and visual capability of entertainment system on a single printed circuit (PC) board.

As discussed further below, system 100 can be integrated with peripheral devices such as a digital video disk (DVD) player controller, a floppy drive controller, and a hard disk drive controller, in a single compact package. Among the functional features, system 100 incorporates a high speed modem for external communications, circuitry for processing 3D graphics data required for such software applications as gaming, and circuitry for generating high quality video and audio from data received from a digital video disk (DVD) and/or compact disk (CD). Additionally, system 100 is able to generate audio and video for traditional television signals in the NTSC format.

System 100 is based on a central processing unit (CPU) 101. The CPU runs the operating system software, provides overall system management, and generates graphics data. CPU 101 may be for example an Intel Pentium® MAX., Cyrix M2, AMD K6, or similar microprocessor. The operating system may be for example the Microsoft Windows 98 system which allows for universal serial bus (USB) expansion, supports DirectX5.0 graphics processing software, the advanced configuration and power interface (ACP), and allows for DVD processing via the ActiveMovie 2.0 software and the Windows driver model (WDM).

System memory 102 supports CPU 101 through north bridge (core logic) 103. System memory 103 may be up to 128 Mbytes of SDRAM (synchronous dynamic random access memory). CPU 101 is additionally supported by an L2 cache 104 which may be for instance 256 or 512 kbytes of static random access memory (SRAM).

North bridge 103 interfaces CPU 101, system memory 102, and the devices on PCI bus 105 and 66 Mhz AGP (accelerated graphics port) bus 106. With regards to the system memory, north bridge 103 acts as the system "host"

managing buffers and registers in system memory required to support devices on the PCI and AGP buses. North bridge 103 also controls the memory operations required by the DRAMs of system memory 102, including physical address generation, read/write control, and cell refresh. North bridge 103 can also operate as the PCI bus master. North bridge 103, along with the south bridge discussed below, collectively form the system core logic chip set.

Graphics processing is based on graphics accelerator 107, operating off of AGP bus 106. Graphics accelerator may include for example a graphics engine with 3D acceleration, and performs, among other things, a variety of texturing operations, the rendering of points, lines and triangles during display image generation and refresh, mono rasterization, blending, fog and transparency control, as well as video and MPEG2/DVD acceleration. It may also include a GUI (graphics user interface) accelerator which performs such tasks as hardware clipping, BitBlits (bit boundary block transfers) within graphics memory 108 and color expansion. An integrated VGA controller and an output to support a TV tuner are also preferably included.

Graphics memory 108 stores color-buffer, z-buffer, video, and texture data and acts as the traditional video/graphics frame buffer.

Video data are exchanged with graphics controller 106 through video port 109. Video port includes a decoder for decoding S-video, NTSC or PAL formatted video data into digital form for use by the graphics processor. Video port 109 also supports the input of NTSC or PAL video from TV-tuner/DVD board which would typically include a TV tuner module, a TV audio decoder and an MPEG2 decoder. Additionally, video port 109 may include a television encoder, which receives VGA and MPEG data from graphics processor 109 and outputs signals in compliance with either the NTSC or PAL television formats for driving a television display.

South bridge 110 bridges PCI bus 105 and an ISA bus 111. South bridge 110 also provides the interface for receiving infrared (IR) signals through an IR window from a remote controller or keyboard and a universal serial bus (USB), collectively shown at block 112.

BIOS ROM 113 holds both the system BIOS (basic input/output system) along with an integrated video BIOS for graphics accelerator 107. In the illustrated embodiment, ROM 113 comprises 2 Mbits of flash memory with segmented ROM support on ISA bus 111.

Coupled to ISA bus 111 is an ISA audio system 114 which operates in conjunction with a PCI-based audio accelerator 115 coupled to PCI bus 105. Digital audio data can be received and processed from ISA bus 111 or from a wavetable synthesizer or a CD-ROM player. The digital audio data, for example, can be converted into analog form and mixed with analog audio data input directly to the device. The analog data can come from such sources as a microphone, a monophonic audio source, or a stereo audio source, such as a CD player. The mixed data can then converted to digital audio and output to ISA bus 111 or audio accelerator 115. Mixed data can also be 3D enhanced and output as analog data.

Accelerator 115 is a DSP (digital signal processor) which, along with its application and driver software, performs various audio processing functions simultaneously on multiple streams of data being exchanged with host based memory buffers in system memory 102 via PCI bus 105 and audio system 114. Generally, accelerator 115 provides acceleration for audio applications used in gaming, DVD and music playback, and video conferencing.

Also operating of PCI bus 105 is a PCI-based modem 116 which supports both data and voice telephony, and FAX transmissions. In a controllerless embodiment, the north bridge 103 acts as the controller and modem 116 employs a DSP for such tasks as data modulation and demodulation, and interfacing with the telephone system and peripheral devices such as speakers and headsets. Modem 116, along with a microphone and a speaker or headset, can be used for digital voice telephony.

Link layer 117 and physical layer 118, in combination, allow for an IEEE 1394 connection to be established with system 100. More particularly, link layer 117 interfaces with PCI bus 105 and physical layer 118 interfaces with at least one IEEE 1394 external port. A power supply 119 sources 3.3 v, 5 v, 12 v and 5 v Aux power. The system clocks are generated by clock circuitry 120 which includes the crystals/crystal oscillators required to drive the various components of system 100.

Connector block 121 represents the external connectors, for connecting to case-external devices, and internal connectors for connecting system 100 with devices packaged with system 100 as a single unit.

As discussed above, the number of gates which can be fabricated on a single integrated circuit chip continues to increase. As a result, one or more of the discrete components of system 100 discussed above may be fabricated together onto a single chip. For example, the graphics accelerator 107 and the graphics memory 108 may be integrated as a graphics/video system on a chip. Moreover, various microcontrollers and DSPs presently found on these discrete devices may be combined in a system on a chip (SoC) including multiple DSPs, microcontrollers, and/or microprocessors, along with random access memory and BIOS ROM.

Systems-on-a-chip are not limited to the entertainment and personal computing system environments, such that discussed above. They are also suitably applied in telecommunications applications such as cellular telephones and personal communicators which require compact systems including a processing device and memory. In these systems, power consumption and heat dissipation are even more critical to insure portability, compactness and sufficient battery life.

The principles of the present invention advantageously allow for selective shut-down of circuit blocks within a single chip integrated circuit device under firmware control. This is particularly important for SoC applications and similar complex high-gate density, high-clock frequency devices. Specifically, during the execution of a given set of instructions, some circuit blocks will be active and performing a corresponding set of data operations, while others are active but not operating on data. In conventional integrated circuits, this second set of circuit blocks, in while not required for actual data operations, nonetheless contributes to the overall power consumption and heat dissipation of the device.

Figure 2:
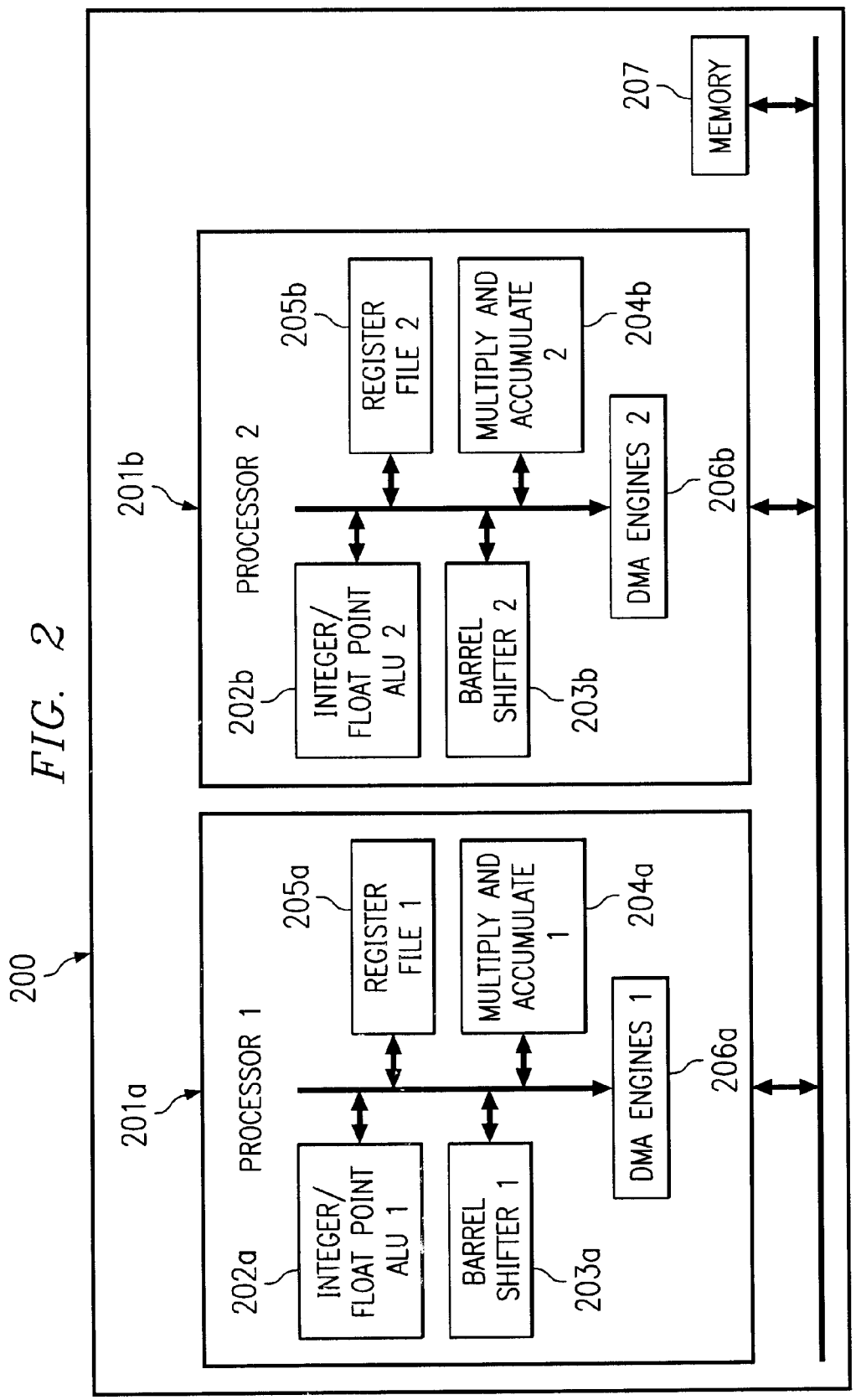
FIG. 2 is a diagram of the major blocks of an exemplary system-on-a-chip (SoC)

Consider first the basic dual processor SoC core 200 shown in FIG. 2. Each processor core 201 operates on data in response to a set of instructions, in software and/or firmware. Arithmetic and logic operations are performed in either an integer or floating point format by an ALU 202 provided in each processor core 201. Each ALU 202 operates in conjunction with a conventional barrel shifter 203 and multiply-accumulate unit (MAC) 204. Operands and results from various mathematical and logical operations are temporarily stored in register files 205. In this example, each processor core 201 is associated with a dedicated direct memory access engine 206, for communicating with on or off-chip memory. In this example, memory 207 is shown on-chip and may include read-only memory (ROM) and/or random access memory (RAM).

A typical basic data operation is described in the following pseudo code:

```
While processor 1;
    Processor 2 <- Sleep Mode; ==
{ X <- R1 + R2;
    Y< - R2 + R8;
    ... . More register transfers but no Multiply, Barrel
Shift, DMA etc.
}
While Processor 1 & Processor 2;
    { Y <- R4*R6 of Processor 1;
        M <- R2*R8 of Processor 2;
        Do memory Transfer R1–R8 to I/O for Processor 1
            Do memory Transfer I/O to R1–R16 for
Processor 2
                ...... No Barrel Shift, No Accumulate
    }
```

In the first part of the code, Processor 1 is adding together the contents of registers R1 and R2 and the contents of registers R2 and R8. Processor 2 is in a "sleep mode" to conserve power since none of its circuitry is required during code execution. Notwithstanding, MAC 204a, Barrel Shifter 203a and DMA Engine 205a of Processor 1 continued to dissipate power even though they are not used.

In the second part of the code, both processors are required for code execution. Here, multiple circuit blocks in each processor 201 are consuming power even though they are not being used to perform data operations. In this example, both processors are performing multiplications and register to I/O transfers but not barrel shifts or accumulates. Thus, the accumulators of blocks 204 and the barrel shifters 203 of both processors are not being used, but nonetheless continue to burn power because the remaining circuitry of the corresponding processors are active and performing operations.

Figure 3:
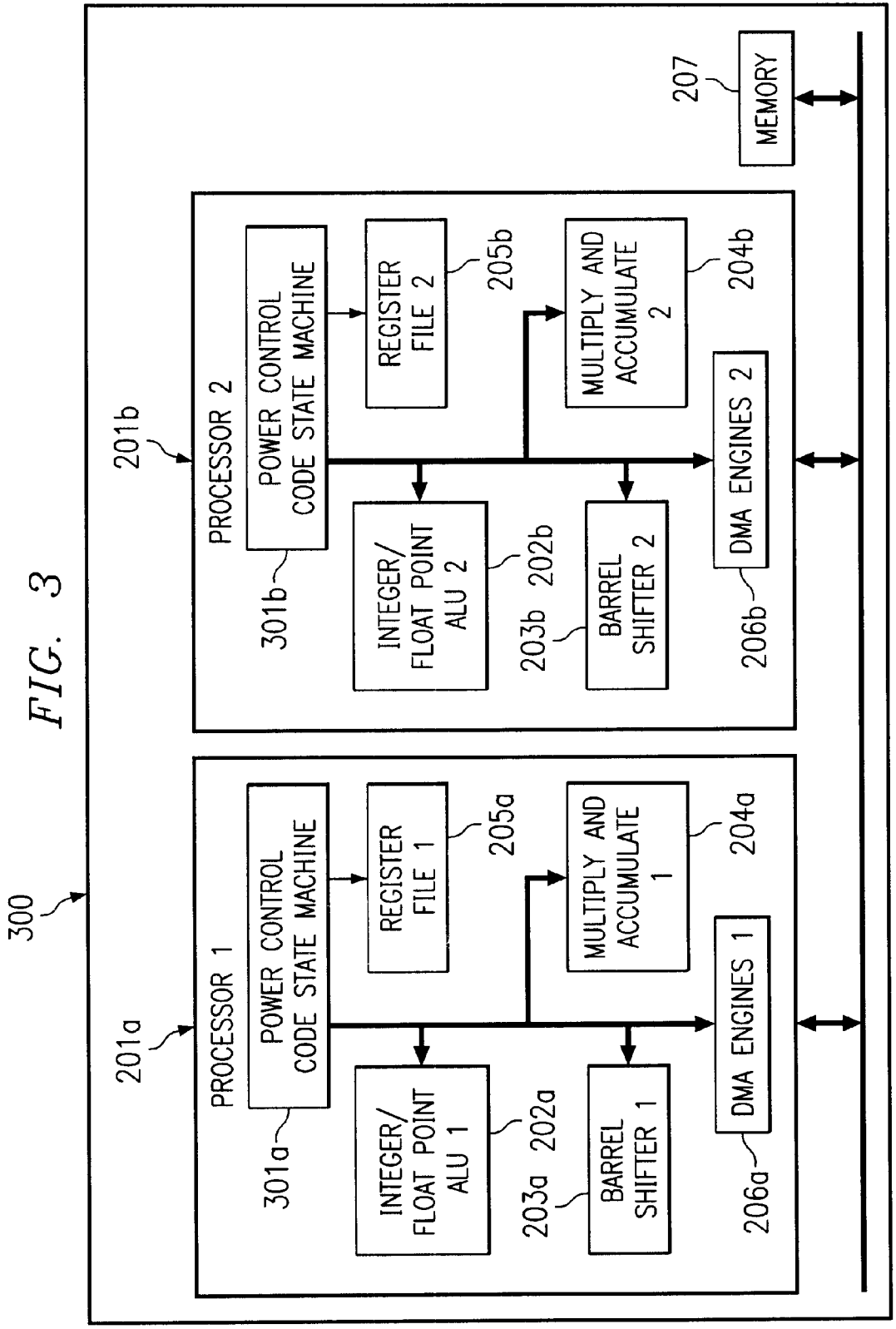
FIG. 3 is a diagram of the major components of an first exemplary SoC embodying the principles of the present invention.

FIG. 3 is a diagram of the major components of an exemplary system 300 including a pair of processing cores 201 similar to those described above. In this embodiment, each processing core further includes a dedicated power control code state machine 301. State machine 301 is linked to the firmware (software) described below and selectively activates or turns to "sleep" various blocks, such as circuit blocks 202–206 within the corresponding processor core. It should be noted that state machines 301 may comprise dedicated power control circuitry or may be implemented using the available overhead of the corresponding processor 201.

According to the present invention, the software or firmware for a given application is written in the normal fashion. However, during compilation, a separate power control code is extracted to generate 'Sleep' and 'Active' states for specific circuit blocks. The input to this compiler is the conventional firmware or software used to configure the device. Following compilation, the resulting firmware is stored in memory 207. The dynamic power control codes are preferable variable length bits appended to the normal firmware flow, but also could be implemented as separate instructions. When variable length bits are used, the variable bit association is performed by looking ahead in the instruction stream and correspondingly enabling or disabling individual circuit blocks. For example, a "logic high" bit status could enable the corresponding circuit block while a "logic low" disables the corresponding circuit block.

The compiler preferable passes through the input firmware or software twice. In the first pass, the compiler identifies those resources that are being used by the application and generates a code to turn off those blocks not used anywhere in the application (i.e. statically disabling blocks never required during the run of the instructions). In the second pass, the compiler creates the dynamic power control code, which turns on and turns circuit blocks as the code is run. In the embodiment of FIG. 3, state machines 301 looks ahead through the instructions being retrieved from memory 207, and in anticipation of their need for a given operation, turns of the required blocks 202–206.

The power saving process can be described further by the following brief example. Assume that it takes 10 clock cycles for a component or logic block to transition to the 'active' mode from the 'sleep' mode and vice a versa. Also assume that each instruction takes one cycle to execute. Therefore, the firmware looks ahead at least 10 instructions to determine which components or circuit blocks are required in the future to execute an upcoming set of instructions and generates the corresponding power control signals. Conversely, if a component or block is required before the next 10 instructions have completed execution, a switch between sleep to active mode is not possible. Additionally, there may be other situations such as jumps, loops or branch conditions where a different set of components or blocks may need activation than those currently active. In such cases, predictive techniques, such as branch prediction may have to be applied or power control simply foregone.

The pseudo-code example provided above, modified according to the principles of the present invention appears as follows:

```
While processor 1; / we assume that only processor
1 is required
        Processor 2 => Sleep Mode; -This is presently
being done in devices
        => Multiply, Barrel Shifter, DMA in
sleep
        { X <- R1 + R2;
        Y< - R2 + R8;
        ... . More register transfers but no Multiply,
Barrel Shift, DMA etc.
        }
        => Processor 2 Active
    While Processor 1 & Processor 2; => Multiply 1&2
active, Accumulate Sleep
        { Y <- R4*R6 of Processor 1;
            M <- R2*R8 of Processor 2; => DMA 1 &2 active
            Do memory Transfer R1–R8 to I/O for Processor 1
                Do memory Transfer I/O to R1–R16 for
Processor 2
                    ......
        }
```

Note "=>" implies power control code bits are being generated or activated by looking ahead with the compiler.

The physical enabling and disabling of circuit blocks and components can be performed in a number of different ways. For example, the voltage supply rail to the transistors in the various blocks can be selectively switched on and off. Additionally, logic may be provided which disables the clock to a given circuit block or places that clock in a predefined sleep mode. Additionally, auto timers may be provided for various components or blocks that are activated by state machines 301 on demand but return to sleep mode when no activity takes place in the elapsed time.

Figure 4:
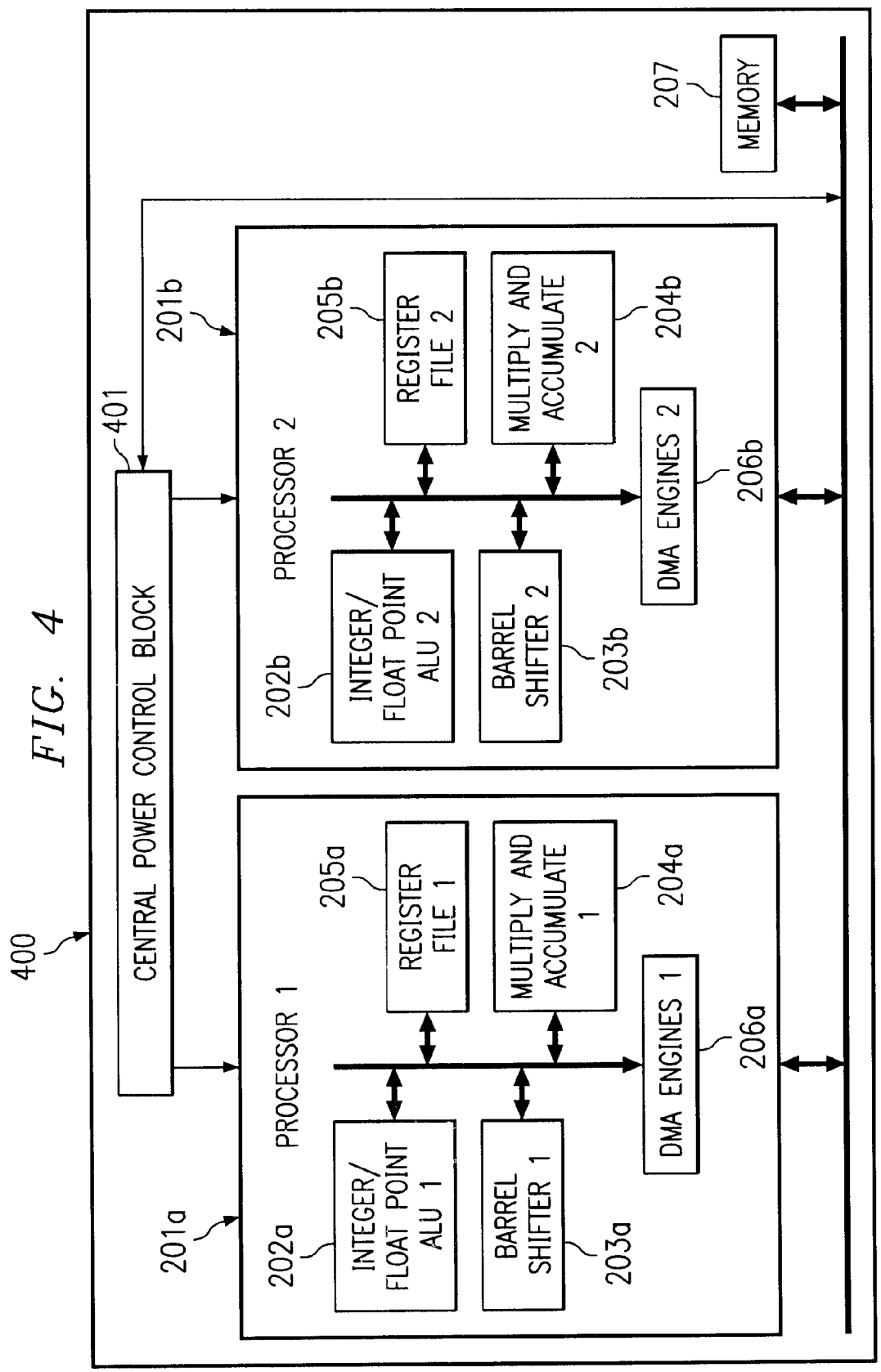
FIG. 4 is a diagram of the major components of a second exemplary SoC embodying the principles of the present invention.

An alternate embodiment 400 is shown in FIG. 4 where a single or centralized power control block 401 is used to the subcircuit blocks of two or more major functional circuit blocks, such as processor cores 201. Power control block similarly operates in response to firmware instructions stored in memory 207 or received from an external source. Power control block 401 can be implemented as discrete logic, a state machine, as a separate controller or by using available overhead from an existing on-chip controller or processor.

The principles of the present invention provide substantial advantages over the prior art. Among other things, while additional logic or clock cycles may be required for switching the components from sleep to active mode and back, these minor penalties are very well justified compared to the overall achievable functional complexity and very high clock speeds available to the designers. Moreover, these principles may also be applied to problems such as static power minimization or leakage power minimization in both CMOS and bipolar applications.

Although the invention has been described with reference to a specific embodiments, these descriptions are not meant to be construed in a limiting sense. Various modifications of the disclosed embodiments, as well as alternative embodiments of the invention will become apparent to persons skilled in the art upon reference to the description of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore, contemplated that the claims will cover any such modifications or embodiments that fall within the true scope of the invention.

What is claimed:

1. An integrated circuit comprising:

a plurality of circuit blocks for selectively performing data processing operations in response to a set of instructions; and circuitry for dynamically activating and deactivating selected ones of said circuit blocks during the execution of said set of instructions in response to power control codes embedded in said set of instructions with bits appended to selected instructions of said set of instructions.

2. The integrated circuit of claim 1 wherein said instructions comprise firmware stored in memory on said integrated circuit chip.

3. The integrated circuit of claim 1 wherein said circuitry for dynamically activating and deactivating comprises a state machine.

4. A system fabricated on a single integrated circuit chip comprising:

a memory for storing a plurality of instructions including embedded power control codes comprising bits appended to selected ones of said plurality of instructions;

a plurality of circuit blocks for performing selected arithmetic and logic operations on data in response to instructions retrieved from said memory; and power control circuitry for looking ahead to the power control codes during execution of selected ones of said instructions and selectively activating and deactivating said plurality of circuit blocks as required to perform corresponding arithmetic and logic operations.

5. The system of claim 4 wherein said plurality of circuit blocks are partitioned into groups and said power control circuitry comprises a central power control block controlling all of said groups of circuit blocks.

6. The system of claim 4 wherein said plurality of circuit blocks are partitioned into groups and said power control circuit comprises a plurality of power control blocks each associated with one of said groups.

7. The system of claim 4 wherein said memory comprises read-only memory.

8. The system of claim 4 wherein said memory comprises random access memory.

9. The system of claim 4 wherein said power control circuitry comprises a state machine.

10. The system of claim 4 wherein at least selected ones of said plurality of circuit blocks form a processor.

11. A method of power control on an integrated circuit including a plurality of circuit blocks for processing data in response to a set of instructions, comprising the steps of:

compiling input code to generate the set of instructions, said step of compiling comprising the substep of embedding dynamic power control codes within the set of instructions by appending bits to selected instructions of the set of instructions;

executing the set of instructions to perform corresponding data processing operations, said step of executing comprising the substep of looking ahead to the power control codes and selectively activating and deactivating corresponding ones of the circuit blocks as required to perform the data processing operations.

12. The method of claim 11 wherein said step of compiling further comprises the substeps of:

during a first pass through the input code, identifying selected ones of the circuit blocks required during execution of the set of instructions; and during a second pass through the input code, inserting the power control codes.

13. The method of claim 11 wherein said step of compiling comprises the substep of statically disabling circuit blocks not required during the execution of the set of instructions.

14. A data processing system comprising:

a bus for transmitting data;

a first processing device for transmitting and receiving data via said bus; and a second processing device for transmitting a receiving data via said bus comprising:

a plurality of circuit blocks for selectively performing data processing operations in response to a set of instructions; and circuitry for dynamically activating and deactivating selected ones of said circuit blocks during the execution of said set of instructions in response to power control codes embedded in said set of instructions said control codes comprising bits appended to selected instructions of said set of instructions.

15. The data processing system of claim 14 wherein said second processing device comprises a system on a chip.

* * * * *